A. S. HATCH.
ELECTRIC WELDER.
APPLICATION FILED APR. 22, 1918.

1,291,501.

Patented Jan. 14, 1919.
4 SHEETS—SHEET 1.

Fig. 1.

Inventor
Austin S. Hatch
By Thomas H. Ferguson
Attorneys.

A. S. HATCH.
ELECTRIC WELDER.
APPLICATION FILED APR. 22, 1918.

1,291,501.

Patented Jan. 14, 1919.
4 SHEETS—SHEET 2.

Inventor
Austin S. Hatch
By Thomas H. Ferguson
Attorney.

UNITED STATES PATENT OFFICE.

AUSTIN S. HATCH, OF DETROIT, MICHIGAN.

ELECTRIC WELDER.

1,291,501.  Specification of Letters Patent.  Patented Jan. 14, 1919.

Application filed April 22, 1918. Serial No. 229,903.

*To all whom it may concern:*

Be it known that I, AUSTIN S. HATCH, a citizen of the United States, residing at Detroit, in the county of Wayne, State of Michigan, have invented certain new and useful Improvements in Electric Welders, of which the following is a specification.

The present invention relates to electric welding machines generally and more particularly to machines in this class which weld in seams rather than in spots, although some of the features are applicable to machines of the spot and butt welding types also.

The principal object of the invention is to provide an improved electric welding machine which will be comparatively simple in construction and especially efficient in operation. To this end it consists in several novel features. Thus I provide a machine having a movable upper electrode arm which may be readily moved by the operation of a treadle. I also arrange the mechanism by which this arm is moved so that a simple movement of a hand link will reverse the directions of the relative movements of the electrode arm and the treadle. In this way it is possible to readily arrange the mechanism for a limited upward movement of the arm for the usual repeated welding operations on the same work or for a more extended upward movement as may be necessary when changing the work. I also provide arcuate electrodes and arrange to rotate them in response to the movements of the treadle during the welding operation and to restore them to their starting positions independently of any directed action on the part of the operator. I also provide a new electrode construction by which all the wear upon the electrode takes place upon a removable rim which may be removed as required without replacing the entire electrode. The connections from the secondary winding of the transformer to the journaled electrodes are also independent of the electrode supporting arms and their journaled connections. I also provide a regulating coil in the transformer circuit so as to maintain a more nearly uniform welding action than has been done heretofore.

All the various features of my invention will be more fully understood upon reference to the following detailed description taken in connection with accompanying drawings and the scope of the invention will be pointed out in the appended claims.

In said drawings.

Referring to the drawings in detail, 10 designates the main frame of the machine. This frame includes a base 11, four uprights or standards 12, a top 13 and a number of transverse bracing members 14. The transformer 15 is mounted upon the top of the frame, adjacent to its forward edge. From the same side of the frame, but at some distance below the transformer, the lower electrode arm 16 projects. It pivotally carries the lower electrode 17 at its outer end. The upper electrode arm 18 similarly pivotally carries the upper electrode 19 at its outer end, but this arm is not fixed to the frame 10, but is pivotally connected thereto by a pivot pin 20, journaled in brackets 21, mounted upon the frame table 13. The upper electrode arm 18 comprises a horizontal member 22 and vertical members 23 and 24. An arm 25 is secured to the upper electrode member 22 and extends rearwardly over the table 13. At its free end it is acted upon by a coiled spring 26 which tends to raise the free end of the arm 18 and the electrode 19. The spring acts between an eyebolt 27 secured to the frame 10 and an eyebolt 28 secured to the free end of the arm 25 and with reference to which it may be adjusted by means of nuts 29.

Figure 1:
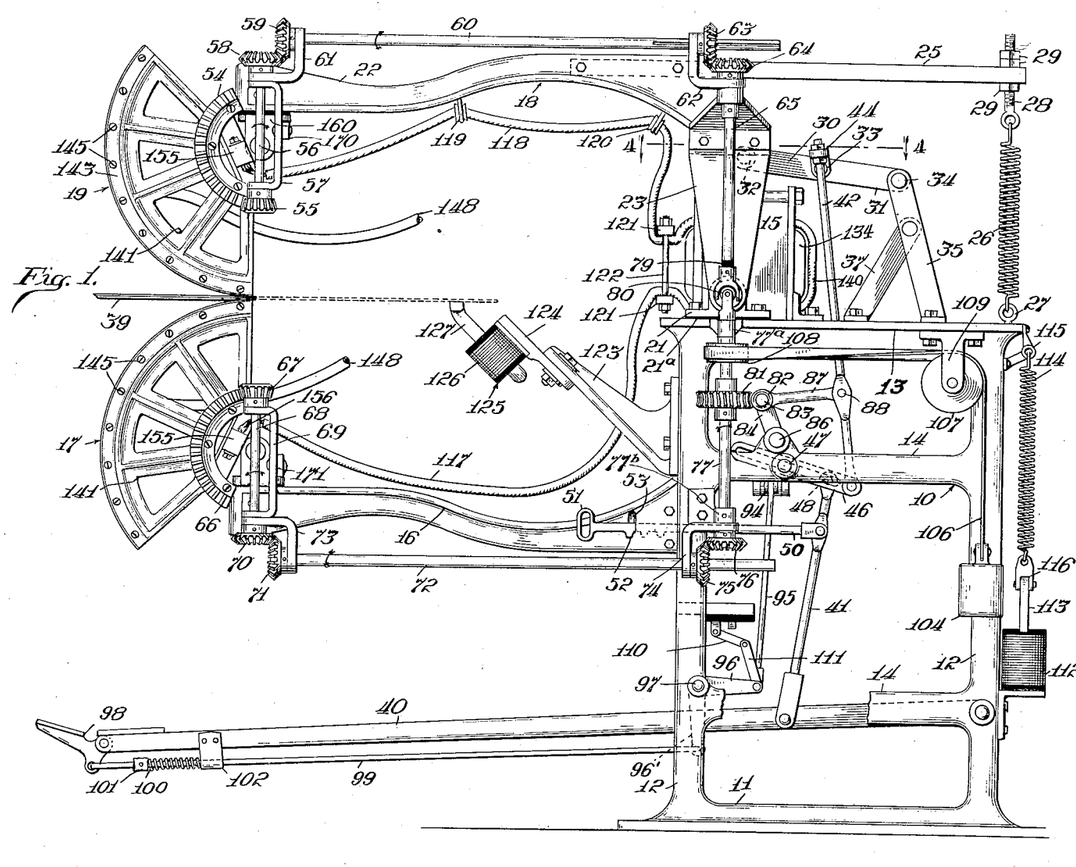
Figure 1 is a side elevation of an electric welding machine, constructed in accordance with the present invention.

In order to force the electrode 19 into engagement of the work it is necessary to move the arm 18 in opposition to the tension of the spring 26. This is accomplished by means of a toggle which includes the toggle members 30 and 31. The members 30 are connected at their forward ends by a pivot pin 32 and a bracket 32ª to the upper electrode arm 18 and at their rear ends to the toggle member 31, the latter connection being made also by means of a pivot pin 33. The toggle member 31 is connected at its rear end to a fixed pivot pin 34 which extends through openings at the upper ends of two inclined standards 35 and 36 which are secured at their lower ends to the main frame. These standards are reinforced by braces 37 and 38. The structure formed by the standards 35 and 36 and the braces 37 and 38 firmly holds the pin 34 against the thrust of the toggle, while the electrode arm 18 is free to move under the action of the latter to force the upper electrode 19 down into engagement with the work. In the present instance, portions of two overlapping plates are shown at 39 between the electrodes as representative of the work upon which they act. In Fig. 1 the full lines represent the work in its initial position and the dotted lines its position when advanced. The electrode arm 18 is insulated from the main frame. For this purpose the brackets 21 which carry the pivot pin 20 upon which said arm is mounted are insulated from the main frame by suitable insulation 21ª and the bracket 32ª, to which the toggle members 30 are connected by pivot pin 32, is also insulated from the arm 18 by suitable insulation 32ᶜ.

Figure 3:
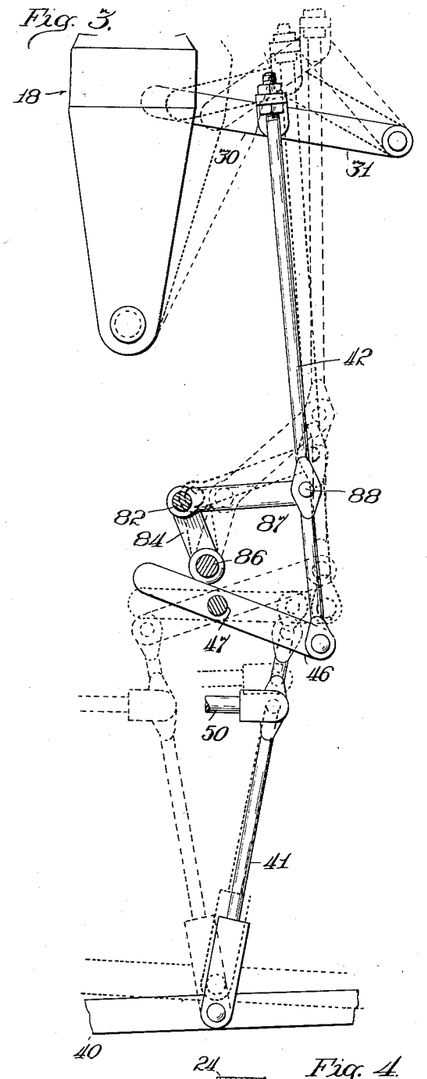
Fig. 3 is an enlarged view of the link mechanism coöperating between the treadle and the upper electrode arm.
Figure 4:
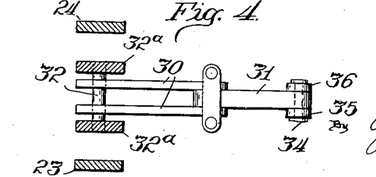
Fig. 4 is a sectional view, taken on a plane indicated by the line 4—4 of Fig. 1, illustrating the toggle connection with the upper electrode arm.

The desired movement is given to the toggle through a link and lever mechanism which is connected with the treadle 40. This mechanism includes a link 41, which is pivotally connected at its lower end to the treadle, and a pair of links 42 and 43 which are connected at their upper ends to the central pivot pin 33 of the toggle through the agency of a saddle 44. The lower ends of the links 42 and 43 are pivotally secured to the rear end of a slotted crank 46 which is integral with, or fixed to, a transverse shaft 47, which in turn is journaled at its ends in two of the cross members 14 of the main frame 10. The upper end of the lower link 41 is provided with a transverse pin 48, which is adapted to ride in slots 49 formed in the adjacent walls of the crank 46. By moving the pin 48 back and forth in the slots 49 the position of the end of the link 41 may be varied relative to the shaft 47. If the parts are in the position illustrated in Fig. 3 in dotted lines, then a downward pressure upon the treadle 40 will cause the link 41 to rotate the rear end of the crank 46 downward and thereby pull upon the links 42 and 43 to straighten the toggle members 30 and 31, as shown in Figs. 1 and 3 in full lines. On the other hand if the link 41 be moved so that its pin 48 lies on the forward side of the shaft 47, as illustrated for example in the dash line position of Fig. 3, then a downward pressure upon the treadle 40 will cause the rear end of the crank 46 to move upward and thereby collapse the toggle to its greatest extent and thereby raise the upper electrode arm 18 and its electrode 19 to the greatest height. It is to be noted that when the parts are in the full line position of Fig. 3 and the toggle members 30 and 31 are most fully extended they do not rest upon or pass beyond dead center and consequently as soon as pressure is removed from the treadle 40, the spring 26, acting upon the upper electrode arm 18, raises it and collapses the toggle so as to bring the parts into the intermediate dotted line position of Fig. 3. The link 41 may be set in any adjusted position by means of a setting link 50 which is provided with a handhold 51 at its forward end and with setting teeth 52 at its lower edge. The rear end of the link 50 is pivotally secured to the link 41 near the upper end of the latter. The link 50 preferably passes through an opening 53 in some portion of the structure, as for example the lower electrode arm 16. By positioning the link 50 so that teeth 52 lie on opposite sides of the opening 53, the link 50 may be held in any desired position and the desired adjustment thereby obtained for the link 41.

The electrodes 17 and 19 are segmental in form and are rotated at a uniform rate by suitable gearing so as to move the work between them and so as to engage the same in a line or seam. The upper electrode is provided with a segmental rack 54 which meshes with a beveled gear wheel 55 secured to the lower end of a vertical shaft 56 journaled in yoke 57 carried by the upper electrode member 22, the yoke 57 being connected to fork 160, as indicated at 170, said fork being in turn pivoted to the member 22, as hereinafter more fully explained. The upper end of the shaft 56 carries a beveled gear wheel 58 which meshes with a beveled gear wheel 59 upon shaft 60 which is journaled at its opposite ends in brackets 61 and 62. The rear end of shaft 60 has a beveled gear wheel 63 splined upon it and this wheel meshes with a similar wheel 64 carried upon the upper end of a vertical shaft 65, the latter being also journaled in the bracket 62. The gearing for rotating the lower electrodes 17 is similar. It includes a rack 66 meshing with a beveled gear wheel 67 upon shaft 68 journaled in a bracket 69 fixed to fork 160 pivoted to the lower electrode arm 16, as indicated at 171. A beveled gear wheel 70 at the lower end of shaft 68 meshes with a similar gear wheel 71 upon the forward end of shaft 72 which is journaled at its forward end in bracket 73 and at its rear end in bracket 74. A beveled gear wheel 75 is splined upon the rear end of the shaft 72 and meshes with a beveled gear wheel 76 mounted upon the lower end of shaft 77 which is likewise journaled in a portion of the bracket 74. The shafts 65 and 77 are connected by a universal joint 80. Suitable insulation 79 intervenes in these gearing connections so as to properly insulate the upper electrode arm 18. Preferably this is provided at the universal joint 80 where it is shown at the point where the lower end of the shaft 65 is fitted to the joint. In order to drive this gearing the shaft 77, which is journaled in bearings 77ª and 77ᵇ, is provided with a worm gear wheel 81 which is fixed to it in position to be driven by a worm 82 upon the outer end of shaft 83 which is journaled in the upper ends of arms 84 and 85 which are loosely mounted at their lower ends upon the shaft 86 which in turn is journaled in two opposing side members 14 of the main frame. The links 84 and 85 together with the worm shaft 83 may be rocked about the shaft 86 through the agency of a broad link 87. This latter link is journaled at its forward end upon the shaft 83 and at its rear end upon a pin 88 which connects the links 42 and 43. The arrangement is such that in the ordinary operation with the upper end of the link 41 in the dotted line position of Fig. 3, the depression of the treadle 40 will straighten the toggle and throw the gearing into meshing engagement, as shown in the full line positions of Figs. 1 and 3, and the removal of pressure from the treadle will collapse the toggle and disconnect the gearing from operative engagement. In case the adjusting link 50 is operated to move the upper end of the link 41 forward of shaft 47 then the depression of the treadle 40 will only increase the collapse of the toggle and will move the worm 82 still farther from the worm wheel 81.

Figure 2:
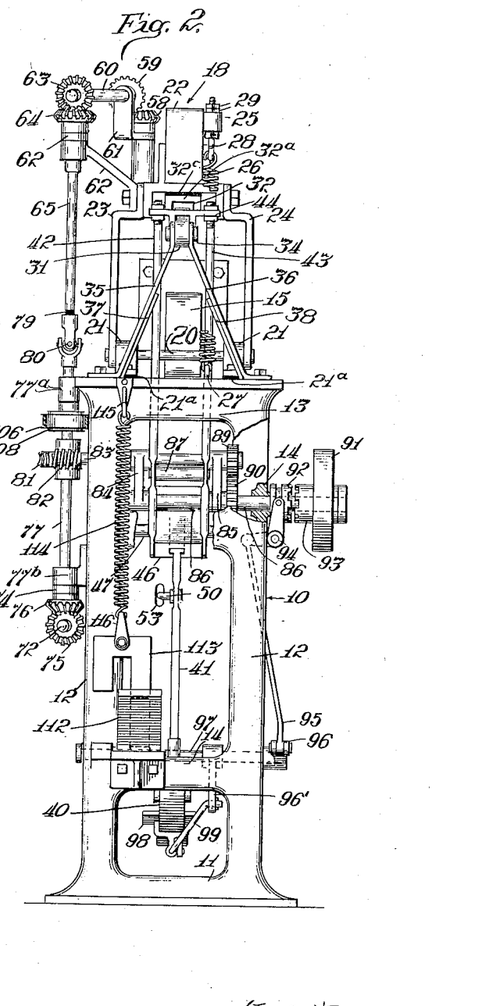
Fig. 2 is a rear elevation of the same machine.

In order that the gearing may be power driven, the shaft 83 is provided with a gear wheel 89 which meshes with a gear wheel 90 upon shaft 86 and the latter is driven from a power driven pulley 91 which normally runs idly upon the shaft but is adapted to be placed in driving connection with the shaft by clutch member 92 splined to the shaft and clutch member 93 fixed to the wheel 91. The operation of the clutch is brought about through a bell crank lever 94, which engages a groove in the clutch member 93 so as to shift said member when actuated and which is connected by a link 95 with a crank arm 96 fixed to a transverse shaft 97 journaled in the main frame in the vicinity of the treadle 40. A second arm 96′ on the shaft 97 is connected to a heel lever 98 by means of a rod 99 which extends along the underside of the treadle 40. Spring 100 coiled about the rod 99 acts between a stop 101 fixed to the rod and a stop 102 fixed to the treadle 40 to maintain the parts in the position illustrated in Figs. 1 and 2, that is to say, in the position in which the clutch is open or unclutched. It will be seen that in the ordinary operation of the machine the depression of the treadle 40 will collapse the toggle and force the upper electrode down upon the work and at the same time place the worm 82 and worm-wheel 81 in mesh with each other. The latter, however, will not be driven until the heel plate 98 is pressed down by the operator in order to throw the gearing into clutching engagement with the driving wheel 91. When the heel plate 98 is thus depressed the electrodes begin to rotate and to carry the work rearward between them. The movement can be readily stopped at any time by merely removing the pressure from the heel plate 98. This can be done without allowing the treadle 40 to rise and therefore without allowing the electrodes to leave the work. When, however, pressure is removed from the treadle then the electrodes will separate from the work and the gearing being disconnected from the driving force will be returned to normal position through the agency of a weight 104, attached to band 106. The band 106 passes over a guide pulley 107 and is secured at its forward end to a pulley 108 upon shaft 77. As the electrodes are power driven from their initial position this band winds up upon the pulley 108. As soon, however, as the driving force is disconnected from the gearing and the electrodes are allowed to separate from the work, the weight unwinds the band 106 and thus restores the different parts to their initial positions. The guide pulley 107 is journaled in a supporting bracket 109 secured to the upper portion of the main frame 10.

It should also be noted that when the heel lever 98 is actuated to apply power to the gearing, circuit is also closed by the closing switch 110 through the action of rock shaft 97 and link 111. This supplies current to the primary winding 134 of the transformer 15. A regulating coil 112 is connected in this circuit and acts as a solenoid upon a movable core 113 to vary the electrical character of the circuit. The movable core 113 is yieldingly held by spring 114 in the position illustrated in Figs. 1 and 2. The upper end of the spring is secured to an eye 115 upon the upper end of the main frame 10 and the lower end of the spring is connected to the core 113 by a yoke 116. The secondary winding 140 of the transformer 15 is connected to the electrodes 17 and 19 by secondary leads 117 and 118. The latter passes through insulating guides 119 and 120, carried upon the horizontal member 22 of the upper electrode arm 18. The leads 117 and 118 are held out of engagement with other parts of the machine at a point adjacent to the transformer by means of a retainer which consists of a couple of transverse bars 121 connected by vertical rods 122. A bracket 123 extends outward from the main frame 10 and carries an adjustable extension 124 upon which a diverting magnet 125 is located. This magnet includes two spools 126 and a U-shaped core having extended pole pieces 127 which are adapted to lie in substantially the same plane as the work, as clearly illustrated in Fig. 1. Whenever current is supplied to the magnet 125 at a time when its pole pieces are in engagement with the metal being welded, a magnetic circuit is completed through a portion of the work which is instrumental in controlling the flow of welding current throughout the work.

Figures 8, 9, 10, 11, 12:
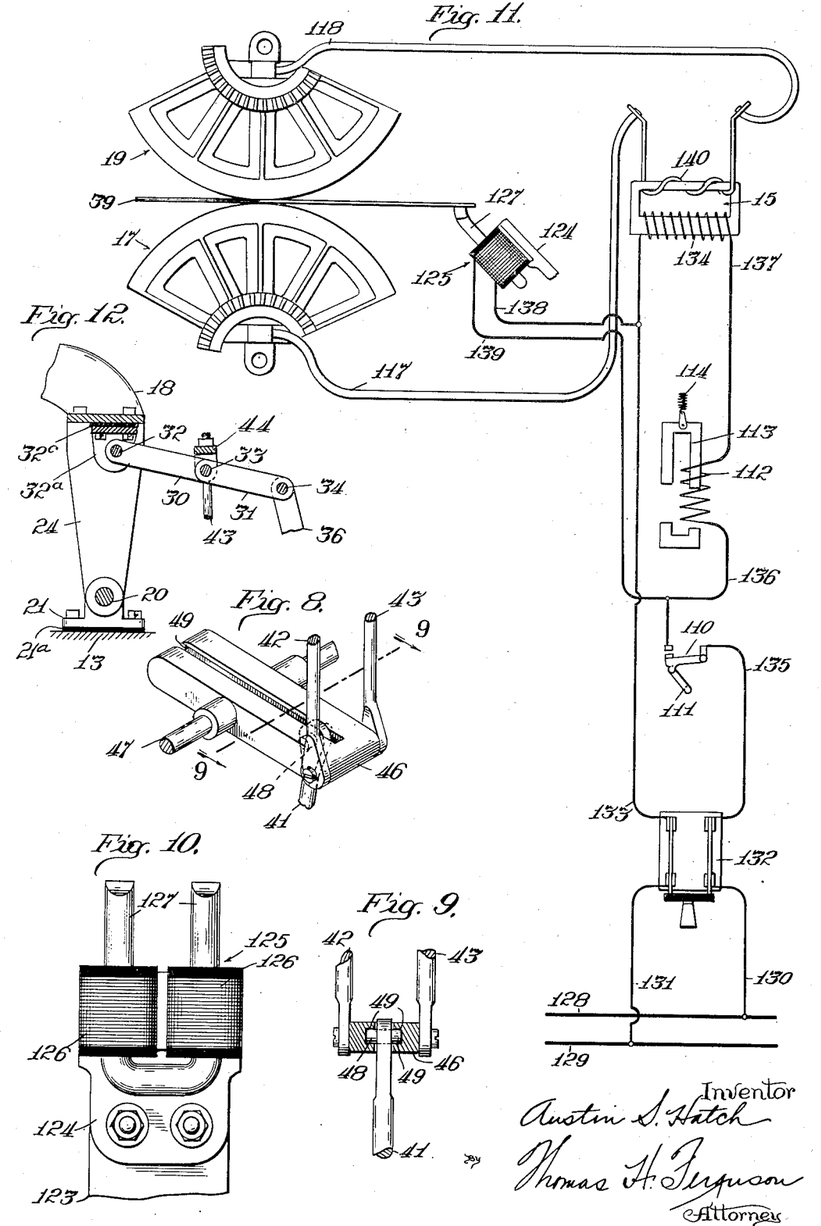
Fig. 8 is a detailed perspective view of a portion of the reversing link mechanism of Fig. 3.
Fig. 9 is a sectional view of the same taken on the plane indicated by the line 9—9 of Fig. 8.
Fig. 10 is a plan view of a current diverting electromagnet which coöperates with the electrodes in directing current through the work.
Fig. 11 is a diagram of electrical connections.
Fig. 12 is a detail view, partly in section and partly in elevation, illustrating the connection of the toggle members to the upper electrode arm. Throughout these views like characters refer to like parts.

An inspection of Fig. 11 shows how these several electrical connections are made. In this diagram the supply wires 128 and 129 are connected respectively by conductors 130 and 131 to the terminals of a manual switch 132. Circuit is extended by conductor 133 from one side of this switch to one terminal of the primary winding 134 of the transformer 15. The other side of the switch 132 is connected by conductor 135 to switch 110. The coöperating contact of this switch is connected by conductor 136 to one terminal of the regulating coil 112 and the other terminal of said coil is connected by conductor 137 to the other terminal of the primary winding 134. The diverting magnet 125 has its winding connected in bridge of this branch circuit by conductors 138 and 139. The secondary winding 140 of the transformer has its terminals connected by the leads 117 and 118 to the electrodes 17 and 19 respectively. It will be seen that assuming that the manual switch 132 is in closed position the closing of switch 110 by the operation of the heel plate 98 will at once supply current to the regulating coil 112, the diverting magnet 125 and the primary winding of the transformer. As a result of the transformer action the alternating primary current supplied from the mains 128 and 129 will induce a flow of current through the secondary circuit of the transformer including the electrodes 17 and 19 and the material of the intervening work 30. The function of the regulating coil 112 is to provide a uniform current to the primary winding 134 and thus produce a constant, or if desired, a decreasing current in the secondary winding 140. Its office is to prevent an unusual amount of current in the secondary circuit at the time the metals begin to weld. When the circuit is first closed there is a resistance between the electrodes caused by impurities on the surface of the work. It requires a certain voltage to overcome this resistance. After the parts begin to fuse, this voltage will force a much larger current through the fused metals than is required. This rush of current has a tendency to burn the welded metals apart and generally leaves a rough weld. The regulating coil 112 prevents this. As the rush of current comes on the coil attracts its core 113 and thus introduces impedance in the primary circuit which is instrumental in bringing about the desired regulation of the current in the secondary circuit. The diverting magnet 125 is employed for quite a different purpose. As the length of the welding seam increases the current has a tendency to pass through the welded portions rather than the unwelded portions because of the lower resistance of the former. This action decreases the amount of the current at the weld until it becomes too small to weld. The magnetic action set up by the diverting magnet 125 in the welded portion of the work diverts the current from the path of lower resistance through the welded portion and causes that through the unwelded portion to increase, in a manner similar to the diversion of a flame by an air blast as in a blow torch. This action is quite fully explained in my prior Patent No. 1,145,413, granted July 6, 1915, although the relation of the magnet to the other parts is somewhat different in that patent.

Figures 5, 6, 7:
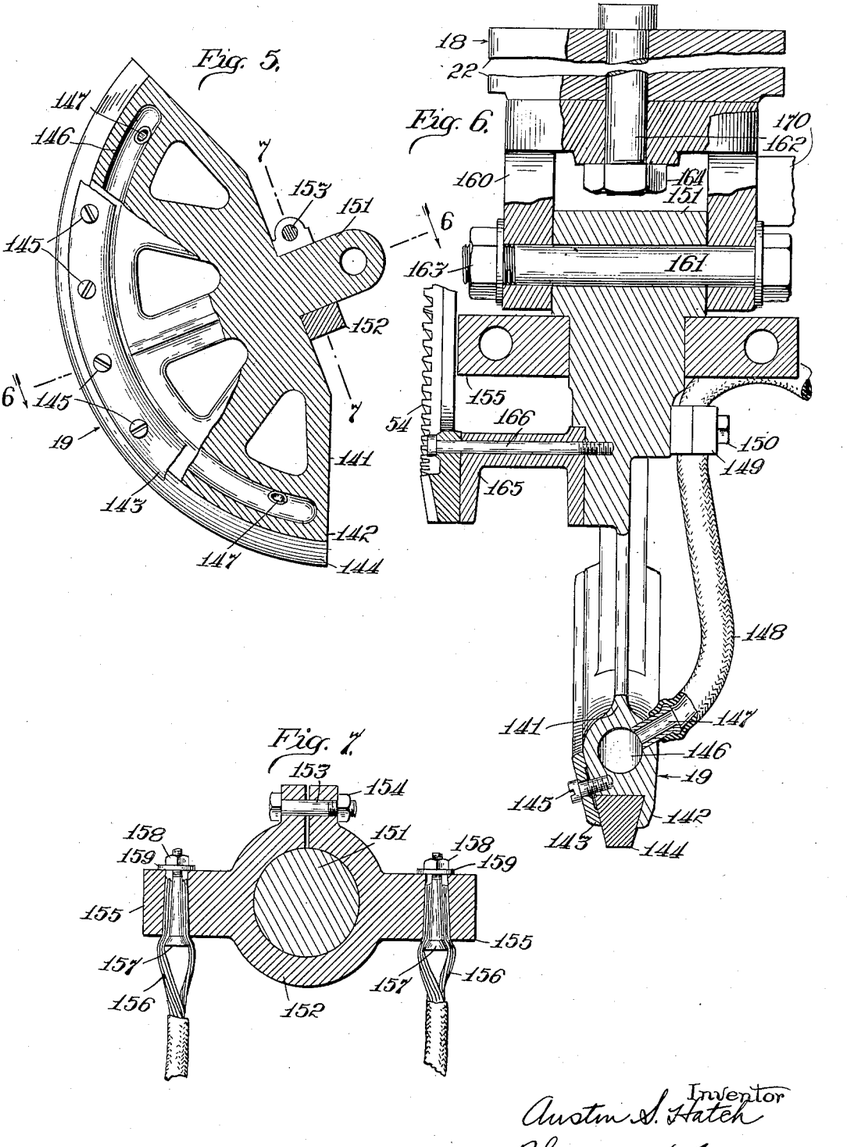
Fig. 5 is a partial sectional elevation of the upper arcuate electrode, the section being taken on a central vertical plane.
Fig. 6 is a transverse section of a portion of the same electrode, the section being taken on a plane indicated by the line 6—6 of Fig. 5.
Fig. 7 is a transverse section of the electrode, taken on a plane indicated by the line 7—7 of Fig. 5, showing the connections of the secondary winding of the transformer.

The electrode structure, which is illustrated more particularly in Figs. 5, 6 and 7, includes a main portion or web 141 having an outwardly extending peripheral flange 142 which coöperates with a removable flange 143 to hold the electrode rim 144 in place. The flange 143 is removably secured to the web 141 by a series of screws 145 and the arrangement of the flanges and rim are such as to provide a dove-tailed engagement in order to firmly hold the rim in place. It will be seen that by removing the screws 145 the flange 143 may be readily removed together with rim 144. The latter can be replaced by a new rim and the parts again assembled.

In order to keep the electrodes cool the peripheral portion of the web adjacent to the rim 144 is provided with an opening or chamber 146. This opening extends practically throughout the length of the rim 144. A nipple 147 extends through an opening in the web into communication with the opening 146. A piece of hose or tubing 148 is slipped over the end of the nipple 147 which is slightly enlarged in order to more readily hold the tube. One or more such nipples 147 may be employed and water connections made therewith. When two such connections are employed as are indicated at 147 in Fig. 5, they are preferably positioned at opposite ends at the opening 146 and water is supplied through one of the nipples and allowed to escape through the other, in each case, of course, a suitable tubular connection being made so as to lead in a fresh supply and properly lead away the waste. Obviously the water conducting tubes can be supported in any desired way and one such way is illustrated by the clamping members 149, shown in Fig. 6, embracing the tube 148 and being secured to the web 141 by a stud bolt 150.

The leads from the secondary winding of the transformer may be variously connected to the electrodes. I prefer, however, to use leads which consist of a large number of small wires and to divide them into two parts and to connect these parts as illustrated in Fig. 7. There the central stem 151 of the web 141 is surrounded by a collar 152 which is securely clamped upon the stem by a bolt 153 and nut 154, the collar being split at one side to allow for a tight fit. This collar is provided with apertured arms 155. The terminal wires 156 of the leads are placed in these apertures and then wedging bolts 157 are forced into the apertures so as to press the wires 156 into close engagement with the walls of the apertures. The bolts 157 are drawn into tight clamping engagement by means of nuts 158 and washers 159. The stem 151 of the web 141 is pivotally mounted upon the forward end of the horizontal member 22 through the agency of the fork 160, a transverse bolt 161 and a vertical bolt 162. The fork 160 embraces the end of the stem 151. The bolt 161 passes through apertures in the stem 151 and depending portions of the fork 160 and is held in place by a nut 163. The vertical bolt 162 passes up through an opening in fork 160 and an opening in member 22 of the electrode arm and by use of a suitable nut 164 upon the bolt 162 the parts will be held in position upon the member 22. In operation the electrode is free to rotate about pin 161 in response to the action of the driving gearing. The parts move freely on the pin 161. In contrast to this the vertical bolt 162 is firmly secured to the fork 160 and by the use of nut 164 the fork 160 may be clamped in any desired angular position. The electrode can thus be set to rotate in any plane within the limits of zero and 90 degrees relative to the vertical plane through the electrode arms 16 and 18. In other words the electrodes may be set to lie in the vertical plane of the arms 16 and 18 or moved a maximum of 90 degrees from that position. By this means the upper and lower electrodes may be placed in convenient positions to suit the easy handling of the work. Since the yokes 59 and 69 are secured to the yoke 160 of the respective electrodes 19 and 17 respectively, it follows that such angular adjustment will move the brackets 61 and 73 respectively and thus draw the shafts 60 and 72 outward. At such times the gear wheels 63 and 75 remain in mesh with wheels 64 and 76 respectively and in driving connection with their shafts by reason of their being splined thereon. They are free to move longitudinally of their shafts without being moved out of operative connection with them. The rack 54 mounted upon the electrode 19 and the rack 66 mounted upon the electrode 17 may be secured thereto in any desired way. In the case illustrated in Fig. 6, wherein the rack 54 is shown, the rack is mechanically supported upon a member 165 and a screw 166 holds the rack in place.

It will be apparent that many structures differing in detail from those herein set forth might be employed. Many changes in proportions of parts and in arrangement of the elements of the structure might also be made. Similarly the extent of the work engaging portion of the electrodes might vary from a few degrees in circumference to a large number of degrees. It is desired therefore to cover all such alterations and modifications by the terms of the appended claims.

What I claim as new and desire to secure by Letters Patent of the United States is:

1. An electric welding machine including relatively movable electrode arms, rotatable arcuate electrodes journaled in said arms, means for moving said arms toward and from each other to bring said electrodes into and out of engagement with the work, means for rotating said electrodes while in engagement with the work, and rigid electrical connections with said electrodes for completing a welding circuit through said electrodes and the intervening work.

2. In an electric welding machine, the combination of a movable electrode arm, a toggle for moving said arm to and fro, link and lever mechanism for extending and contracting said toggle, a treadle for operating said mechanism, and means for varying said mechanism to change the relative directions of movement of said electrode arm and treadle.

3. In an electric welding machine, the combination of a rotatable electrode, a movable electrode arm, a toggle for moving said arms, mechanism for extending and contracting said toggle, gearing for rotating said electrode, and means actuated by said mechanism for changing the operative condition of said gearing.

4. In an electric welding machine, the combination of a rotatable arcuate electrode, gearing for rotating said electrode, a power driving member, means for operatively connecting said gearing to said member to rotate said electrode in one direction and independent gearing to rotate said electrode back to its initial position.

5. In an electric welding machine, the combination of a rotatable electrode, a movable electrode arm, a treadle, mechanism actuated by said treadle to shift said arm to and fro, a power shaft, gearing for rotating said electrode, means operated by said mechanism to place said shaft and gearing in driving relation, a clutch on said shaft, a lever on said treadle, and connections for actuating said clutch in response to the operations of said lever.

6. In an electric welding machine, the combination of an electrode supporting arm, an arcuate electrode journaled in the outer end of said arm, a transformer, and rigid electrical connections from the secondary winding of said transformer to said electrode independent of said arm and its journaled connection to said electrode.

7. In an electric welding machine, the combination of an electrode supporting arm, an arcuate electrode journaled in the outer end of said arm, said electrode including a web having a chambered peripheral portion, a relatively light removable arcuate work-engaging rim carried upon said peripheral portion of said web in close heat conducting relation to the chamber in said portion, and means for supplying a cooling fluid to said chamber.

8. An arcuate seam welding electrode, comprising a central web having an outwardly extending peripheral flange, a coöperating peripheral flange removably secured to said web on the opposite side of said web from said first mentioned flange, said flanges having their opposing faces converging outward, a light removable arcuate work-engaging rim having similar outward converging faces engaging said flange faces, and means for securing said removable flange to thereby firmly hold said rim in place.

9. In an electric welding machine, the combination with coöperating welding electrodes, of a transformer having its secondary winding connected in circuit with said electrodes, current supply wires connected in circuit with the primary winding of said transformer, a solenoid in said latter circuit, and an elastically mounted core for said solenoid movable variable distances into said solenoid in response to its variable pull.

10. In an electric welding machine, the combination with coöperating welding electrodes and current supply wires, of a transformer having its primary and secondary windings connected respectively in circuit with said supply wires and electrodes, a solenoid in series with the primary winding of said transformer, a yieldingly mounted core adapted to be drawn variable distances into said solenoid in response to its pull, and a controlling magnet for producing a magnetic circuit through the work connected to said wires in parallel with the windings of said solenoid and the primary winding of said transformer.

11. An electric welding machine including relatively movable electrode arms, electrodes carried by said arms, a treadle mechanism for bringing said electrodes toward each other into operative engagement with intervening work in response to the actuation of said treadle in one direction and for separating said electrodes a definite distance in response to the actuation of said treadle in the opposite direction, and means for varying said mechanism to increase the distance said electrodes will be separated in response to operations of said treadle.

12. An electric welding machine including relatively movable electrode arms, rotatable electrodes on said arms movable into various planes relative to the plane of said arms, means for setting said electrodes in different ones of said planes, and means for rotating said electrodes when so set.

13. An electric welding machine having vertically and horizontally rotatable arcuate electrodes, means for moving said electrodes both vertically and horizontally and means for closing a path for welding current through said electrodes and intervening work.

14. An electric welding machine including relatively movable electrode arms, rotatable arcuate electrodes journaled in said arms, a toggle for moving said arms toward and from each other to bring said electrodes into and out of engagement with the work, link and lever mechanism for extending and contracting said toggle, a treadle for operating said mechanism, means for rotating said electrodes while in engagement with the work, a transformer, and electrical conductors extending from the secondary winding of said transformer to said electrodes, said conductors being mechanically fixed to said electrodes.

15. In an electric welding machine, the combination of a rotatable arcuate electrode, gearing for rotating said electrode, a power driving member, means for operatively connecting said gearing to said member to rotate said electrode in one direction, and a weight and connection adapted to be wound up during the said rotation of said electrode and operative when free to rotate said electrode back to its initial position.

16. In an electric welding machine, the combination of a rotatable electrode, a movable electrode arm, a toggle for moving said arm to and fro, link and lever mechanism for extending and contracting said toggle, a treadle for operating said mechanism, a power shaft, gearing for rotating said electrode, means operated by said mechanism to place said shaft and gearing in driving relation, a clutch on said shaft, a lever on said treadle, and connections for actuating said clutch in response to the operations of said lever.

17. An electric welding machine including relatively movable electrode arms, electrodes carried by said arms, a toggle for moving said arms toward and from each other, link and lever mechanism for extending and contracting said toggle, a treadle for operating said mechanism, and means for varying the relative positions of parts of said link and lever mechanism to increase the extent of collapse of said toggle in response to the operations of said mechanism.

18. An electric welding machine including relatively movable electrode arms, electrodes carried by said arms, a toggle for moving said arms toward and from each other, a slotted crank arm, links connecting said arm and said toggle, a treadle, a link connecting said treadle and crank arm and having its connection with said crank arm shiftable in the slot of said arm, and means for holding said shiftable connection in set position.

19. An electric welding machine including relatively movable electrode arms, electrodes carried by said arms, a toggle for moving said arms toward and from each other, a crank arm having a slot extending on both sides of its axis, a treadle, links connecting said crank arm to said toggle and to said treadle, one of said links having a connection with said crank arm slidable in its slot into positions on both sides of its axis, and means for holding said slidable connection in set positions on either side of said axis.

20. An electric welding machine including relatively movable electrode arms, electrodes on said arms movable together into various planes relative to the plane of said arms, and movable relatively to each other in each of said planes, means for setting said electrodes in said planes, and means for moving said electrodes relatively to each other when so set.

21. An electric welding machine having a vertically and horizontally movable electrode, a coöperating horizontally movable electrode, means for moving said first mentioned electrode vertically and horizontally, means for moving said coöperating electrode horizontally in conjunction with the horizontal movement of said first mentioned electrode, and means for closing a path for current through said electrodes and intervening work.

22. In an electric welding machine, the combination with coöperating welding electrodes, of a transformer having windings connected in circuit with said electrodes, current supply wires connected in circuit with windings of said transformer, a solenoid in circuit with windings of said transformer, and an elastically mounted core for said solenoid movable variable distances into said solenoid in response to its variable pull.

23. In an electric welding machine, the combination with coöperating welding electrodes and current supply wires, of a transformer having windings in circuit with said supply wires and electrodes, a solenoid in series with certain of the windings of said transformer, a yieldingly mounted core adapted to be drawn variable distances into said solenoid in response to its pull, and a controlling magnet for producing a magnetic circuit through the work connected to said supply wires in parallel with the windings of said solenoid and windings of said transformer.

In testimony whereof I have hereunto subscribed my name this 16th day of April, A. D. 1918.

AUSTIN S. HATCH.